United States Patent [19]

Takeda et al.

[11] 3,725,325

[45] Apr. 3, 1973

[54] GRANULATED VINYL CHLORIDE RESIN MATERIAL

[75] Inventors: Masao Takeda; Eiichi Iida, both of Tokyo; Tsuneo Komatsubara, Kamakura-shi; Yutaka Kagoshima, Kawasaki-shi, all of Japan

[73] Assignee: The Japanese Geon Company, Ltd., Tokyo, Japan

[22] Filed: Nov. 12, 1969

[21] Appl. No.: 876,096

[30] Foreign Application Priority Data

Nov. 16, 1968 Japan..................................43/83538

[52] U.S. Cl....260/29.1 R, 260/29.6 R, 260/29.6 PT, 260/31.8 R, 260/33.4 R, 260/78.5 T, 260/85.5 S, 260/85.7, 260/87.5 C, 260/92.8 A

[51] Int. Cl..............................................C08f 45/24

[58] Field of Search......260/29.6 R, 29.6 PT, 31.8 R, 260/92.8 A, 33.4 R, 29.1 R

[56] References Cited

UNITED STATES PATENTS

| | | | |
|---|---|---|---|
| 3,586,654 | 6/1971 | Lerman et al. | 260/29.6 R |
| 3,541,047 | 11/1970 | Boyer et al. | 260/29.6 R |
| 2,538,273 | 1/1951 | Rhines | 260/29.6 PT |
| 2,556,260 | 6/1951 | Downing | 260/92.8 A |
| 2,831,840 | 4/1958 | Lindeboom | 260/92.8 A |
| 2,981,722 | 4/1961 | Enk et al. | 260/87.1 R |
| 3,111,506 | 11/1963 | Roussillon et al. | 260/92.8 A |
| 3,205,204 | 9/1965 | Heckmaier et al. | 260/29.6 R |

*Primary Examiner*—Harold D. Anderson
*Attorney*—Sherman and Shalloway

[57] ABSTRACT

A granulated material of vinyl chloride powder for paste processing having the specific average grain size, the specific bulk density and the specific dispersibility in plasticizer, and the process for the preparation of sol composition of vinyl chloride resin.

2 Claims, No Drawings

GRANULATED VINYL CHLORIDE RESIN MATERIAL

This invention relates to a granulated vinyl chloride resin material, particularly to a granulated material of vinyl chloride resin powder to be processed into paste resin.

As is well known, vinyl chloride resin for paste processing is prepared drying an aqueous emulsion by, for example, by spray drying, such emulsion being obtained through polymerization of vinyl chloride, or of a monomeric mixture composed of at least 50 wt. percent of vinyl chloride and one or more vinyl-type monomers copolymerizable therewith, in the manner of ordinary aqueous emulsion polymerization method; or through such procedures as described in U.S. Pat. No. 2,981,722, in which vinyl chloride or the aforesaid monomeric mixture is polymerized in an aqueous dispersion which has been homogenized in the presence of a surface active agent, by the action of an oil-soluble catalyst (Hereinafter this polymerization process is referred to as the homogenized dispersion polymerization in the present specification). The obtained vinyl chloride resin for paste processing normally has a bulk density measured in accordance with ASTM D 1895–67 within the range of 0.2 – 0.4, and a size of no greater than 10 microns. Because this vinyl chloride resin is in the form of such fine size particles, it has a very strong tendency to become dust, lending itself to extremely cumbersome and difficult handling on such occasions as transportation of the powder, packing into bags, supply to processing apparatus, etc. Furthermore, the scattering of resin powder also causes material loss and is detrimental to the workers' health.

Heretofore, various attempts have been made to aggregate such resin particles to increase their particle diameters. For example, agglutination of resin particles by salting out the resin emulsion, or freezing and melting the emulsion; or by heating the resin emulsion or powder, have been proposed. However, the vinyl chloride resin used for paste processing is required to be in the powdery state of such fine particles, as a primary, inherent property. That is, it is considered essential for the particles to have such fine diameters as not greater than 10 microns, so that they can perform Brownian motion against gravity and form a non-precipitating, stable sol when dispersed in a plasticizer, in a diluent or in a plasticizer-diluent mixture. SInce such resin particles of larger diameters as obtained by aggregating fine particles through above-described proposals cannot be more easily dispersed to the sizes sufficiently reduced to form a stable sol in a plasticizer, with conventionally employed plastisol making apparatus, although they are admittedly easier to handle, they are useless as a vinyl chloride material for paste resin.

The first object of the present invention is to provide a granulated vinyl chloride resin material for paste processing, which is easy to handle and can form a stable sol when mixed with a plasticizer and/or diluent.

The second object of the present invention is to provide a process for the preparation of a vinyl chloride resin sol composition free of the foregoing drawbacks caused by the fine particle sizes of vinyl chloride resin for paste processing, by mixing the granulated vinyl chloride resin material for paste processing of the shape easy to handle, with a plasticizer and/or diluent, such granulated resin material being obtained by aggregating and granulating the vinyl chloride resin powder to be formed into paste resin.

Other objects and advantages of the invention will become apparent from the following descriptions.

It has been discovered that the granulated material meeting the following conditions, which is formed of a mixture of vinyl chloride resin for paste processing with a liquid coagulant (coagulating agent), accomplishes the foregoing objects of the invention:

1. that the average grain size thereof is at least 100 microns in diameter,
2. that the bulk density of the granulated material measured in accordance with ASTM D 1895–67 is at least 1.25 times that of the resin powder particles before granulation,
3. that the grains have such a breaking strength that, when they are subjected to a test with an automatic sieve with cutting and whirling under the conditions of cutting at 140 times/min. and whirling at 240 r.p.m., the quantity thereof passing through Tyler 60 mesh within 2 minutes is not more than 50 percent, and
4. that the grains have such a dispersibility in plasticizer that, when 100 parts by weight of the granulated material is mixed with 60 parts by weight of dioctyl phthalate by means of a two rod-double motion planetary mixer (vessel capacity: 2.7 liters) for 30 minutes, the resulting sol has a grind meter value of not more than 300 microns as measured in accordance with ASTM D 1210–64.

Such a granulated vinyl chloride resin material is prepared, for example, as follows: first, an aqueous emulsion obtained by ordinary polymerization of vinyl chloride in an aqueous medium is converted to dry, powdery vinyl chloride resin for paste processing of the particle size not greater than 10 microns, for example, by spray drying method. Then the powder is mixed with at least one liquid coagulant such as water, lower alcohol, plasticizer of vinyl chloride resin, aqueous dispersion containing vinyl chloride resin particles, etc. The suitable ratio of the liquid coagulant to the vinyl chloride resin should range 10 to 50 percent by weight, preferably 20 to 30 percent by weight. The resulting mixture is granulated with an ordinary extrusion granulating machine or the like, and dried in the conventional manner such as fluidized drying.

Now the granulated resin material of the invention will be explained in fuller details. In the preparation of the granulated resin material, powdery vinyl chloride resin for paste processing of the particle size not greater than 10 microns in diameter is mixed with liquid coagulant. When the amount of liquid coagulant to be mixed with 100 parts by weight of the resin exceeds 50 parts by weight, or, 30 parts by weight depending on the properties of the powdery resin employed, the resulting mixture becomes a sol from which granulated material cannot be prepared by any means of granulation. When the amount of liquid coagulant is less than 10 parts by weight, in certain cases less than 20 parts by weight depending on the properties of the powdery resin employed, granulation of the entire mixture is difficult, leaving a portion thereof in the form of fine powder. Such a product is still difficult to handle. When a plasticizer is used as the liquid coagulant, the suitable amount of the plasticizer to be mixed with the powdery vinyl chloride resin for paste processing ranges from not less than 10 parts to less than 40 parts, preferably 20 – 30 parts, to 100 parts of the latter, the parts being by weight.

At the time of mixing the above resin powder with liquid coagulant or coagulants such as water, lower alcohol, aqueous dispersion containing vinyl chloride resin particles, plasticizer, etc., it is disadvantageous to add such liquid coagulant abruptly into the resin powder, since this tends to cause non-uniform dispersing of the coagulant in the resin and localized conversion of the latter to sol. It is desirable that the resin-coagulant mixture is obtained in the form of powder moistened with the liquid coagulant, which forms blocks when compressed by hand.

Lower alcohols useful as the liquid coagulant include liquid alcohols having 1 – 8 carbons, preferably 1 – 4 carbons. Also the aqueous dispersions containing vinyl chloride resin particles include those in which dry, powdery particles of vinyl chloride resin obtained by known polymerization of vinyl chloride or of a monomeric mixture composed of at least 50 wt. percent of vinyl chloride and a vinyl-type monomer copolymerizable therewith, and drying the product, are dispersed. Also the aqueous dispersion obtained by polymerizing vinyl chloride or such monomeric mixture in aqueous systems (e.g., suspension polymerization, aqueous emulsion polymerization, homogeneized dispersion polymerization) can likewise be directly utilized, since they contain vinyl chloride resin particles. The preferred aqueous dispersions among the above are those containing the particles of vinyl chloride resin for paste processing. As the plasticizers useful as the coagulant, those used for paste processing of vinyl chloride resin as later named can be utilized. In the present invention, "vinyl-type monomers which are copolymerizable with vinyl chloride" include olefins such as ethylene and propylene; vinyl esters such as vinyl acetate and vinyl propionate; vinyl ethers such as vinyl methyl ether; unsaturated acids such as acrylic, methacrylic, maleic, and fumaric acids and their esters; aromatic vinyl compounds such as styrene; and nitriles such as acrylonitrile.

In the preparation of granulated resin material of the invention, when, for example, a wet compression extrusion granulating machine is used, the degree of compression of resin particles (particles density) can be controlled by varying the r.p.m. of the screw, screen mesh, etc. If the degree of compression is unsatisfactorily low, only insufficient granulation takes place, while excessive degree of compression tends to cause objectionable alteration of resin particle surfaces due to the heat generated during the granulation step, or develop such properties of the resin particles undesirable for its processing into paste resin. Also when drying the granulated product, exposure of the product to high temperatures for a prolonged period tends to cause fusion of grain surfaces, etc., which deteriorates the product's dispersibility in the plasticizer. The optimum granulation conditions can be readily determined by those skilled in the art, as soon as the starting resin or resins, liquid coagulant and granulating machine are specified.

Thus the granulated resin material of the invention which has an average diameter of at least 100 microns, preferably not less than 200 microns, ranging from several millimeters to several centimeters, and a particle density of at least 1.25 times the bulk density of the starting resin powder measured in accordance with ASTM D 1895-67, preferably a particle density of at least 0.4 g/cc, can be obtained. It can be understood that the granulated product is thus given a notably increased average size by aggregation of unit resin particles obtained by polymerization of monomer or monomers in an aqueous medium, compared with the normal vinyl chloride resin powder for paste processing which has an average particle diameter of not more than 10 microns, conventionally less than approximately 2 microns, and a bulk density of approximately 0.2 to 0.4.

The granulated product of the invention must have a certain degree of resistance to mechanical impact or pressure as well as such great diameters so as to remain as the granules easy for handling without being broken in the steps of packing in bags, transportation, etc. With these properties, the product will not be easily broken again into fine particles before it is mixed with a plasticizer and/or diluent. As already mentioned, it is an essential requirement of the granulated product of the invention that its particle density should be at least 1.25 times the bulk density of the resin powder before granulation. The above requirement is important because, if the particle density is lower than the set level, the granulated product is easily broken into fine powder, and cannot withstand bulk transfer or tends to scatter as fine dust during packing into bags or supply to processing apparatus, failing to achieve the primary object of the invention to provide a granulated material easy of handling. The resistance to mechanical impact required of the granulated material of the invention is defined as the particle breaking strength expressed in that, when the product is subjected to a test with an automatic sieve with cutting and shirling under the conditions of cutting at 140 times/min. and whirling at 240 r.p.m., the amount thereof passing through Tyler 60 mesh within 2 minutes should not exceed 50 percent.

The granulated resin product of the invention is easy to handle because it is aggregated and granulated into large size granules and possesses a particle breaking strength to withstand the defined level of impact, and furthermore has a characteristically good dispersibility in plasticizers, which allows the direct use of the product as the starting material of paste resin. As mentioned above, the degree of compression of the granules, i.e., particle density, is variable during the granulation step. When the particle density is excessively high, or the granulated product is exposed to high temperatures for a prolonged period during the drying to cause surface fusion, the product's dispersibility in plasticizers tends to be impaired. The dispersibility in plasticizers required of the granulated product of the invention is defined to be such that, when 100 parts by weight of the granulated product is mixed with 60 parts by weight of dioctyl phthalate (DOP) in a two-rod-double motion planetary mixer (vessel capacity: 2.7 liters) for 30 minutes at a charge factor of 1, the resulting sol should have a grind meter value measured in accordance with ASTM D 1210-64 of not higher than 300 microns.

The granulated resin material of the invention having the, (1), average particle diameter, (2), bulk density, (3), particle breaking strength, and (4), dispersibility in plasticizer, as defined above, is suitable to be directly used for paste processing, possessing concurrently such properties which are heretofore considered as incompatible with each other.

The plasticizers to be blended with the above granulated resin material for making the intended sol composition of vinyl chloride resin in accordance with the invention include widely the known plasticizers used for ordinary paste processing of vinyl chloride resin. For example, phthalic acid ester type plasticizers such as diethyl phthalate, dibutyl phthalate, dihexyl phthalate, dioctyl phthalate, didecyl phthalate, etc.; phosphoric acid ester type plasticizers such as tricresyl phosphate, trioctyl phosphate, etc.; adipic acid ester type plasticizers such as dioctyl adipate; epoxy plasticizers such as butyl epoxystearate, etc.; glyceride type plasticizers, and polyester type plasticizer can be named.

Also as the diluent to be used together with, or instead of, the above plasticizers, for making similar sol compositions, any of heretofore known diluents used for ordinary paste processing of vinyl chloride resin can be used. The diluents can be divided into two categories of dispersant and diluent, and may be used singly or in combination. As the dispersant, for example, ketones such as methyl isobutyl ketone, diisobutyl ketone, etc.; esters such as butyl acetate; glycol ethers such as ethylene glycol monomethyl ether, etc. may be named, and as the diluent, for example, paraffin hydrocarbons such as mineral spirit, mineral turpentine, etc.; naphthenic hydrocarbons such as cyclopentane, cyclohexane, and derivatives thereof, etc.; aromatic hydrocarbons such as toluene, xylene, etc.; and terpenes can be named.

The mixing ratio of the granulated resin material of the invention with such plasticizer and/or diluent is that within the range normally employed in ordinary paste processing, i.e., in organosol processing, 40 – 400 parts by weight of the diluent or a mixture of the diluent with plasticizer is used per 100 parts by weight of the resin, and in normal plastisol processing, 40 – 400 parts by weight of the plasticizer is used per 100 parts by weight of the resin. In the preparation of paste sol from the granulated material of the invention, it is permissible to suitably blend additives other than the plasticizer and diluent, such as coarse particulate resin to increase quantity, gelling agent, heat stabilizer, lubricant, filler, viscosity-lowering agent, coloring agent, foaming agent, foam stabilizer, wetting agent, etc.

Hereinafter the invention will be explained with reference to working examples.

EXAMPLE 1

A 20-liter capacity kneader blender was charged with 3 kg of a powdery vinyl chloride resin for paste processing ("Geon 121", product of The Japanese Geon Co. Ltd.), and to which 1 kg of water was gradually added under stirring, followed by 10 minutes additional stirring (Sample 1). Similarly, each 3 kg of above powdery vinyl chloride resin for paste processing was mixed with 1 kg of DOP (dioctyl phthalate) (Sample 2), with 2 kg of an aqueous emulsion containing the same resin (solid concentration: approximately 39 percent) (Sample 3), and with 1 kg of aqueous methanol containing 20 wt percent of methanol (Sample 4). All of the four resulting mixtures were in the form of moist powder, and could be compressed into blocks by hand. The coagulant content was approximately 25 percent by weight in all cases. A twin screw powder extruder was used as the granulating machine, which was run under the conditions of 44 screw rotations per minute, screen mesh of 3.0 mm in diameter, and at a extrusion rate of 125 kg/hr. Thus granulated products were dried by fluidized bed type dryer for 20 minutes, at 70° C. or 80° C., except that the granulated product in which DOP (dioctyl phthalate) was used as the coagulant, was subjected to no drying treatment.

The state of the obtained granulated products and results of measurement of their properties relating to the paste processing were as indicated in Table 1. 12

TABLE 1

| Sample No. | Coagulant Type | Content (percent) | Drying condition (° C. x min.) | Content of volatile component (percent)[1] | Particle size[2] | Bulk density (g./cc.)[3] | Particle breaking strength (percent)[4] | Dispersibility in plasticizer (μ)[5] | Initial viscosity of sol cps.[6] |
|---|---|---|---|---|---|---|---|---|---|
| 1 | Water | 25 | 80° C. x 20 | 0.68 | 1.5φ x 2.5 mm | 0.45 | 4 | 65 | 5,300 |
| 2 | DOP[7] | 25 | ...... | 0.60 | 2.5φ x 5 mm | 0.70 | 3 | 38 | 6,500 |
| 3 | Resin emulsion[8] | 25 | 80° C. x 20 | 0.55 | 2.5φ x 5 mm | 0.43 | 5 | 25 | 6,500 |
| 4 | Aqueous methanol | 25 | 70° C. x 20 | 0.64 | 1.5φ x 2.5 mm | 0.47 | 4 | 62 | 5,500 |
| Geon 121 (control sample) | | | | 0.50 | 1.1μ | 0.31 | 100 | 25 | 6,500 |

[1] Approximately 1 g. of the sample taken into a weighing bottle was precisely measured to the order of 0.1 mg. by means of a chemical balance. The sample was spread into uniform thickness, heated at 105±2° C. for an hour, left to cool off to room temperature in a desiccator, and its weight measured. The content of volatile component was calculated to two places of decimals by the equation below. The measurement was conducted three times and the mean value thereof was taken.

$$V = \frac{B-C}{B-A} \times 100$$

in which,
V: content of volatile component (percent)
A: weight of the weighing bottle (g.)
B: weight of the weighing bottle containing the sample (g.)
C: weight of the weighing bottle containing the sample, after the air-cooling (g.).

[2] The particle diameters φ of the granulated product of the invention were measured with a hammer-head calipers, and those of the control sample, "Geon 121," were measured through electron microscope photograph, and their weight average particle diameters (D) were tabulated.
[3] Measured in accordance with ASTM D 1895-67.
[4] Measured by the method described in the specification.
[5] Measured by the method described in the specification.
[6] One-hundred (100) parts by weight of each sample granulated product was blended with 60 parts by weight of DOP (dioctyl phthalate, and formed into paste sol. The initial viscosity thereof was measured at 25° C. using Brookfield LVF viscometer and #1 spindle. The viscosity value at 6 r.p.m. was adopted.
[7] Dioctyl phthalate.
[8] As water.

From the results indicated in above Table 1, it is apparent that the products of this invention were very effectively granulated in comparison with the commercial vinyl chloride resin powder for paste processing prepared by ordinary spray drying, "Geon 121" (control specimen), upon comparing their bulk densities and particle diameters. The particle breaking strength of the granulated products was such that as will sufficiently withstand normal handling. Furthermore, the product also exhibited good dispersibility in various plasticizers, and thus were excellent materials for making paste resin.

EXAMPLE 2

Thirty parts by weight of water were gradually added to 100 parts by weight of vinyl chloride resin powder for paste processing under stirring, followed by 10 minutes additional agitation. The resulting mixture was placed in a cylindrical vessel of 13 mm in diameter and 39 mm in height, and compressed from head to be formed into samples of various degrees of compression. The rod-formed samples were dried by vacuum drying method.

The properties of the rod-formed resin granules and measurement results of their properties relevent to paste processing were as indicated in Table 2 below.

TABLE 2

| Sample No. | Degree of compression (percent)[1] | Drying condition (° C. x min.) | Content of volatile component (percent) | Particle density (g./cc.)[2] | Particle breaking strength (percent) | Dispersibility in plasticizer ($\mu$) | Initial viscosity of sol (cps.) |
|---|---|---|---|---|---|---|---|
| 1 | 20 | 30° C. x 20 | 0.45 | 0.47 | 55 | 25 | 6,500 |
| 2 | 30 | 30° C. x 20 | 0.62 | 0.54 | 43 | 25 | 6,800 |
| 3 | 40 | 30° C. x 20 | 0.58 | 0.63 | 32 | 38 | 6,100 |
| 4 | 50 | 30° C. x 20 | 0.65 | 0.76 | 29 | 51 | 5,800 |
| 5 | 50 | 30° C. x 40 | 0.55 | 0.76 | 0.3 | 100 | 4,900 |
| 6 | 50 | 80° C. x 60 | 0.50 | 0.76 | 0.1 | (*) | 3,900 |
| 7 | 70 | 30° C. x 20 | 0.66 | 1.26 | 17 | 77 | 5,100 |
| Geon 121 (control sample) | | | 0.52 | | 100 | 25 | 6,600 |

[1] The reduction ratio in apparent volume of the resin was measured.
[2] The specific gravity of the rod-like granule was measured.

* More than 300$\mu$ (scale off).

It is apparent from the results demonstrated in Table 2 that the granulated products of this invention have large diameters, exhibit no tendency to be easily broken into dust, and have good dispersibility in plasticizers. It can be also understood that the granulated product of low degree of compression easily becomes dust, and that the product dried at high temperatures tends to have reduced dispersibility in plasticizer.

We claim:

1. A granulated vinyl chloride resin powder for paste processing selected from vinyl chloride homopolymers and copolymers of vinyl chloride and one or more monomers copolymerizable therewith containing at least 50 percent by weight vinyl chloride having
   1. an average grain size of at least 100 microns in diameter,
   2. a bulk density of the granulated material measured in accordance with ASTM D 1895–67 of at least 1.25 times that of the resin powder particles before granulation,
   3. a breaking strength that, when the grains are subjected to a test with an automatic sieve with cutting and whirling under the conditions of cutting at 140 times/min. and whirling at 240 r.p.m., the quantity thereof passing through Tyler 60 mesh within 2 minutes is not more than 50 percent, and
   4. a dispersibility in plasticizer that, when 100 parts by weight of the granulated powder is mixed with 60 parts by weight of dioctyl phthalate in a two-rod-double motion planetary mixer of 2.7 liters in vessel capacity for 30 minutes, the resulting sol has a grind meter value of not more than 300 microns as measured in accordance with ASTM D 1210–64.

2. A plastisol or organosol composition of a vinyl chloride resin which consists essentially of 100 parts by weight of a granulated vinyl chloride resin powder selected from vinyl chloride homopolymers and copolymers of vinyl chloride and one or more monomers copolymerizable therewith containing at least 50 percent by weight vinyl chloride and at least 40 parts by weight of plasticizer for vinyl chloride resin or a diluent used for paste processing, said granulated vinyl chloride resin powder having
   1. an average grain size of at least 100 microns in diameter,
   2. a bulk density of the granulated material measured in accordance with ASTM D 1895–67 of at least 1.25 times that of the resin powder particles before granulation,
   3. a breaking strength that, when the grains are subjected to a test with an automatic sieve with cutting and whirling under the conditions of cutting at 140 times/min. and whirling at 240 r.p.m., the quantity thereof passing through Tyler 60 mesh within 2 minutes is not more than 50 percent, and
   4. a dispersibility in plasticizer that, when 100 parts by weight of the granulated powder is mixed with 60 parts by weight of dioctyl phthalate in a two-rod-double motion planetary mixer of 2.7 liters in vessel capacity for 30 minutes, the resulting sol has a grind meter value of not more than 300 microns as measured in accordance with ASTM D 1210–64.

* * * * *